ance, Apr. 20, 1977

United States Patent [19]
Hasselbacher

[11] 4,157,641
[45] Jun. 12, 1979

[54] CONNECTOR FOR METAL PARTS

[76] Inventor: Wilhelm Hasselbacher, 8530 Neustadt, Aisch, Fed. Rep. of Germany

[21] Appl. No.: 789,030

[22] Filed: Apr. 20, 1977

[30] Foreign Application Priority Data

May 4, 1976 [DE] Fed. Rep. of Germany ....... 2619707

[51] Int. Cl.² .............................................. E06B 3/16
[52] U.S. Cl. ..................... 52/802; 403/294; 49/DIG. 1
[58] Field of Search .................. 403/294, 331; 52/619, 52/620, 621, 732, 802, 803, 804, 810; 49/501, DIG. 1, DIG. 2

[56] References Cited
U.S. PATENT DOCUMENTS

| 3,336,713 | 8/1967 | Privas | 52/619 X |
| 3,373,538 | 3/1968 | Prager | 52/619 X |
| 3,750,333 | 8/1973 | Vance | 49/501 |

FOREIGN PATENT DOCUMENTS 549809 12/1957 Canada ..................................... 52/619

Primary Examiner—Andrew V. Kundrat

[57] ABSTRACT

A connector interposed between spaced metal parts, for example cavitied or hollow doors or window frames, consisting of an elongated plastics core which can be slid lengthwise between the metal parts in assembly and has a longitudinal cavity for receiving a wedge strip to expand and fasten the core in position.

13 Claims, 7 Drawing Figures

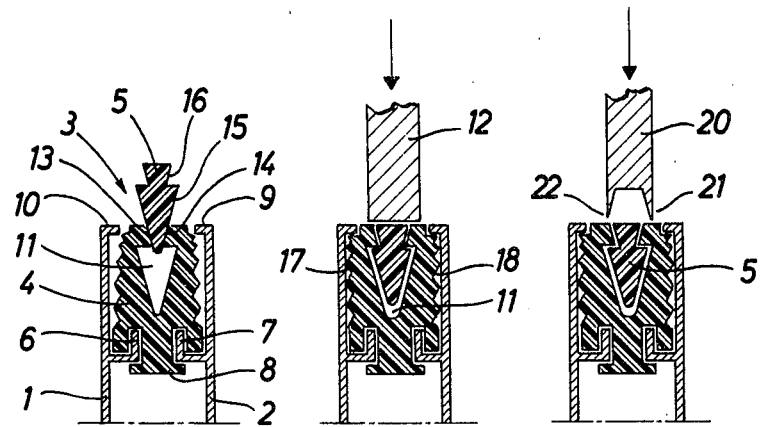
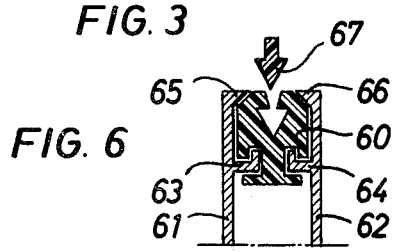
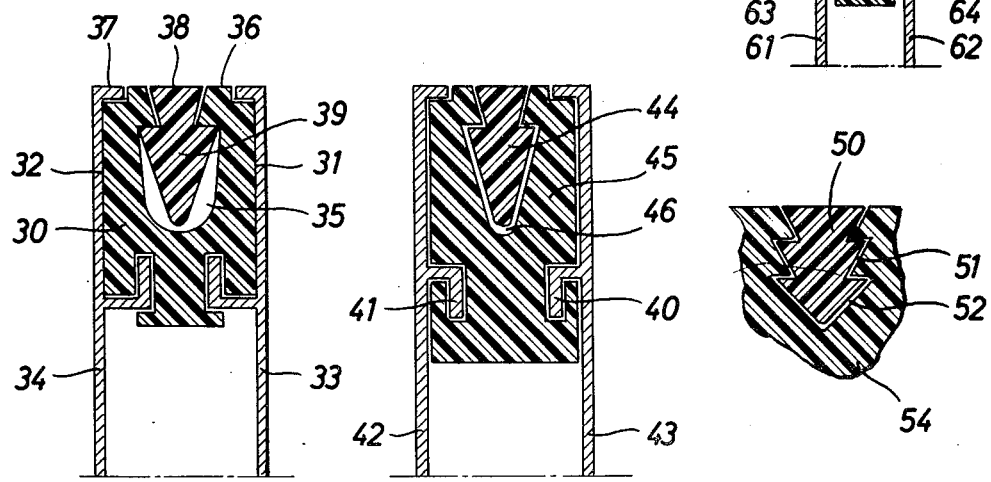
FIG. 1  FIG. 2  FIG. 3  FIG. 6  FIG. 4  FIG. 5  FIG. 7

CONNECTOR FOR METAL PARTS

BACKGROUND OF THE INVENTION

This invention relates to connectors for spaced metal parts, for example a pair of light metal plates disposed parallel to one another, comprising a one-piece plastics core which is held or anchored to the metal parts and is displaceable in the longitudinal direction of the connector.

As is known, metal parts such as metal plates, for example used for windows and doors, have to be held apart so as to provide heat insulation between them. Various heat insulating connections have been used for this purpose. Thus for example it is known to keep the two metal plates spaced from one another by tools and to make a connector strip from a plastic foam; this system involves heavy machine and tool outlay; in many instances the stability of the foam cells breaks down as a result of changes in thermal condition or the metal plates. Since the foam plastic connection is only releasable with difficulty, if at all, from the metal parts it is impossible to subsequently handle these parts, for example for anodising. U-shaped solid plastic profile shapes are known which can be brought in mirror image fashion into the jointing area to define a hollow space which is then filled with plastics foam. This again demands a heavy outlay in machine and tool costs; where there are thermal fluctuations the profile shapes may be contracted, particularly where the connection between the foam plastic and the metal parts demand an intimate adhesion. Any metal parts damaged in this way can only be subsequently anodised with difficulty.

It is also known to use a strip which is constituted by a completely plastic profile and can be drawn laterally into an accommodating cavity at the intended connection site. A solid profile of this nature is on the one hand difficult to introduce over long lengths, and on the other hand involves heat barrier problems, if only because of the uniform degree of hardness thereof.

It is an object of this invention to provide a connector of the type set forth above which exhibits good heat insulating properties.

Another object is to provide a connector which can be introduced very simply into the required working position.

SUMMARY OF THE INVENTION

To these ends, the invention provides a connector for spaced metal parts comprising an elongated one-piece core of plastics material for longitudinal sliding engagement with projections on the metal parts, the core being substantially non-elastic at the part thereof engaging the projections but of increased elasticity at the outer part and having a longitudinal cavity in this outer part, and a strip of wedge shape in cross section engaged in said cavity.

Although the connector according to the invention may be solid, with a cavity for accommodating the wedge strip, the differing resilience within the core means that the trapping of heat is substantially better than with a solid plastic profile as mentioned above. Moreover special shaping of the cavity can mean additional insulating air gaps in the core itself.

The non-resilient region preferably may have the hardness of wood or the like. Advantageously the wedge strip can have a neck also of wedge form. The plastics core can be serrated, ribbed, or the like at its outer faces to procure an even better heat insulation. It is also possible for the outer face of the plastics core to make a substantially flat face-to-face engagement with at least one metal part in the operative condition; this will provide for a united body, the outer surfaces of which are flush.

The cavity for accommodating the wedge strip may be substantially greater than the corresponding shape of the wedge strip; this increases the effect mentioned above of additional conservation of heat because of the air space.

To hold or anchor the non-resilient region of the plastics core against the metal parts, the said projections on the metal parts are preferably of L-shape cross-section and the plastics core is provided with longitudinal recesses to receive said projections and to enclose the outer limb of the L at both ends at least. The L projections are preferably completely enclosed by the plastics core in the working condition.

The plastics core may be provided with beveled outer edges engaging with matching beveled edges on said metal parts.

BRIEF DESCRIPTION OF THE DRAWINGS

A number of embodiments of the invention are illustrated in the accompanying drawings, in which:

FIGS. 1 to 3 illustrate in cross section an embodiment of the invention in different operating stages;

FIG. 4 is a similar, but second embodiment of the invention, shown assembled;

FIG. 5 is a third and modified form of the invention;

FIG. 6 is a fourth and modified form of the invention; and

FIG. 7 is a detail of a fifth modification of the invention.

DESCRIPTION OF THE PREFERRED EMBODIMENT

Referring first to FIGS. 1 to 3, two aluminum plates 1 and 2, which for example are to be used for the frame of the front door of a house, are insulated at their outer rim by an elongated connector of plastics material generally designated 3. This consists of a plastic core 4 and a separate wedge-form strip 5.

L-shaped ribs 6 and 7 are provided at the inner sides of each of the two aluminum plates 1 and 2 and used to hold or anchor the plastic core 4. This core is inelastic in the vicinity of these metal ribs 6 and 7, to which end the plasticiser used in the manufacture of the plastics core 4 at this area is different from that used in the vicinity of the wedge strip 5.

The plastics core is provided at the side thereof remote from the outer margin with a T-shaped projection 8 so that the metal ribs 6 and 7 are at least partially enclosed, as illustrated.

During installation the plastics core 4 is drawn over the metal ribs 6 and 7 at right angles to the plane of the drawing to hold the metal parts 1 and 2 at a fixed spacing from one another.

The free edges of the metal parts 1 and 2 are provided with flanges 9 and 10 the function of which is described below.

The plastics core 4 has a recess 11 accommodating a part of the wedge-shaped strip 5. The part of the plastics core 4 at this area can readily be expanded. This effect is produced by introduction of the wedge-shaped strip 5, for example by means of a pressing roller 12.

As can be seen from FIG. 1 the two opposed edges 13 and 14 of the plastics core 4 are devised so as to be convergent towards the center. The inclination of these two edges 13 and 14 corresponds—but this is not absolutely essential—approximately to the inclination 15 of the leading section of the wedge-shaped strip 5 and approximately to the inclination 16 of a neck portion of the strip 5.

The strip 5 can be pushed into recess 11 using a presser roller 12, as can be seen from FIG. 2. The outer walls 17 and 18 of the core 4 are ribbed or heavily serrated so as to prevent any "smooth" application against the metal parts 1 and 2. This gives better insulation.

As can be clearly seen from FIG. 2 there is no problem in changing or varying the wedge strip, even when the same plastics core is used, so that the pressure application against the metal parts 1 and 2 can be varied and, inter alia, the recess 11 can be completely filled. This enables various effects to be achieved with a modest amount of change.

As can be seen from FIG. 3 even the plastics core can readily be removed. Use for this purpose may for example be made of a roller 20 having knife edges 21 and 22 capable of cutting through the plastics core at the resilient region, namely at the level of the neck. After this strip 5 can be removed without difficulty. The plastics core will then be pulled out again at right angles to the plane of the drawing. Finishing, for example galvanising of the aluminum parts, is then possible without any particular difficulty.

The embodiment of the invention illustrated in FIG. 4 uses a similar plastics core 30 the outer walls 31 and 32 of which can however be united to the metal plates 33, 34, for example by cementing. Connection of this character should not however be used if heat conservation is to be increased and for example an approximately semicircular or semi-spherical cavity 35 is provided. Even in this arrangement the upper edge 36 intimately seals against the metal parts 33 and 34; this also applies to the upper edge 38 of the wedge strip 39.

In the embodiment illustrated in FIG. 5 L-shaped metal parts 40 and 41 are provided on the aluminum plates 42 and 43 and are so devised as to provide an anchorage for the plastics core 45 in which the metal parts 40 and 41 are completely enclosed by the plastics core—in the non-resilient zone thereof, of course. The wedge strip 44 is disposed in a recess 46 which conforms with the shape of this strip.

The embodiment illustrated in FIG. 5 can also be used where an air-sealed closure is required.

In the embodiment illustrated in FIG. 6 the shape of the core 60 is substantially that used in the arrangement of FIG. 4. Two metal plates 61 and 62 have metal ribs 63 and 64 similar to those of FIGS. 1 and 4.

The free edges 65 and 66 of the metal plates 61 and 62 are of a form different from those of the embodiment above described. These edges 65 and 66 are inclined inwards at an angle of approximately 45°, and the plastics core is similarly shaped.

When the wedge strip 67 is pushed in there is pressure against the inclined surface of the edges 65 and 66. As a result of this pressure the plastics core 60 on the one hand and the wedge strip 67 on the other hand are adjusted in a plane at right angles to that of the drawing, thereby prohibiting shifting of the core relatively to the metal plates 61, 62, which may for example be of aluminum.

Finally in the embodiment illustrated in FIG. 7 the wedge strip 50 is provided with a plurality of bevel surfaces 51 and 52 to cater for an even firmer connection with the resilient zone of the plastics core 54.

Polystyrol, polypropylene and polyvinylchloride can for example be used in the manufacture of the plastics core. In all instances different plasticisers can be used to obtain the contrasting resilience in the core.

The same plastics can be used for the wedge strips, but this must be harder than the surrounding elastic regions of the core; the wedge strip can, inter alia, have approximately the same smaller degree of resilience than the non-resilient region of the core.

Connectors according to this invention can very readily be made or assembled even in small and average sized metal works. The outlay for assembly is small because, for example, only a presser roller, and possibly also a cutter roller, are required.

Should there be any damage to the metal surfaces these can be machined without any particular expense, and removal of the connector of the invention presents no difficulties. The quickly-made and particularly economic connection according to the invention means substantial saving in shipping and storage costs; the pressure applied against the metal parts is variable or can be regulated.

The metal parts may be of copper, brass or other metals; the invention can also be used in the case of steel doors.

What is claimed is:

1. An improved connector for spaced metal parts, said metal parts having facing projections of L-shape cross section; comprising an elongated one-piece core of plastic material shaped for longitudinal sliding engagement and to enclose the outer limbs of said L-shape projections, said core being substantially non-elastic at the part thereof engaging said projections but of increased elasticity at the outer part and having a longitudinal cavity in this outer part; and a strip of wedge shape cross section engaged in said longitudinal cavity.

2. A connector according to claim 1, in which the wedge strip has, in cross-section, a tapered head with a tapered neck.

3. A connector according to claim 1, in which said plastics core is provided with longitudinal ribs at the faces thereof engaging said metal parts.

4. A connector according to claim 1, in which the outer face of the plastics core makes substantially flat face-to-face engagement with at least one of said metal parts.

5. A connector according to claim 1, in which said cavity is of substantially greater cross-sectional area than the said wedge strip.

6. A connector according to claim 1, in which the plastics core is provided with beveled outer edges engaging with matching beveled edges on said metal parts.

7. An improved connector for spaced metal parts having longitudinal, parallel, facing metal L-shaped projections, comprising an elongated one-piece core of plastic material having a longitudinal inner portion substantially non-elastic and shaped with recesses to receive and engage said L-shaped projections and to enclose at least one leg of said L-shaped projections, and a longitudinal outer portion of increased elasticity and having a longitudinal cavity; and an elongated strip of wedge shape cross section sized for engagement in said cavity.

8. The apparatus of claim 7 wherein the elongated one-piece core outer portion further comprises inwardly projecting ribs in partial closure of said cavity, and said elongated strip wedge shape cross section is notched for securing said wedge shape in said cavity inside said ribs.

9. The apparatus of claim 7 wherein the elongated one-piece core further comprised a longitudinal ribbed surface in facing engagement with said metal parts.

10. The apparatus of claim 7 wherein the elongated one-piece core further comprises a longitudinal, substantially flat surface in facing engagement with said metal parts.

11. The apparatus of claim 7 wherein the cross-section of said cavity is greater than the cross-section of said wedge shape strip.

12. The apparatus of claim 7 wherein said metal parts further comprise longitudinal edges turned inwardly in facing relationship and said one-piece core of plastics material has longitudinal grooves along its outer portion edges for engagement against said longitudinal edges.

13. The apparatus of claim 12 wherein said longitudinal edges have an inner bevel and said longitudinal grooves have a matching outer bevel.

* * * * *